(12) United States Patent
Koerber (10) Patent No.: US 8,258,642 B2
(45) Date of Patent: Sep. 4, 2012

(54) METHOD AND SYSTEM FOR RESONANCE DAMPENING IN WIND TURBINES

(75) Inventor: Arne Koerber, Berlin (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/245,979

(22) Filed: Sep. 27, 2011

(65) Prior Publication Data
US 2012/0139243 A1 Jun. 7, 2012

(51) Int. Cl.
*F03B 9/00* (2006.01)
(52) U.S. Cl. ............................................. 290/44; 290/55
(58) Field of Classification Search ..................... 290/43, 290/44, 54, 55; 416/170 R
See application file for complete search history.

(56) References Cited

U.S. PATENT DOCUMENTS

| | | | |
|---|---|---|---|
| 7,309,930 B2 * | 12/2007 | Suryanarayanan et al. | 290/55 |
| 7,372,174 B2 * | 5/2008 | Jones et al. | 290/44 |
| 7,501,798 B2 | 3/2009 | Laubrock et al. | |
| 7,511,385 B2 * | 3/2009 | Jones et al. | 290/43 |
| 7,755,209 B2 * | 7/2010 | Jones et al. | 290/44 |
| 7,902,686 B2 * | 3/2011 | Andersen et al. | 290/44 |
| 8,004,100 B2 * | 8/2011 | Scholte-Wassink | 290/44 |
| 2010/0072751 A1 | 3/2010 | Andersen et al. | |

OTHER PUBLICATIONS

Dixit, Amit and Shashikanth Suryanarayanan, "Towards Pitch-Scheduled Drive Train Damping in Variable-Speed, Horizontal-Axis Large Wind Turbines." Proceeding of the 44th IEEE Conference on Decision and Control, and the European Control Conference, 2005, Seville, Spain, Dec. 12-15, 2005 pp. 1295-1300.

* cited by examiner

*Primary Examiner* — Nicholas Ponomarenko
(74) *Attorney, Agent, or Firm* — Global Patent Operation; Douglas D. Zhang

(57) ABSTRACT

A resonance damping system for a wind turbine having a generator connected to a power grid, the resonance damping system comprising an adaptive resonance damper, operable to provide a control signal for the generator, wherein the variable torque signal of the adaptive resonance damper is automatically adjusted according to a parameter which represents a grid condition.

20 Claims, 6 Drawing Sheets

METHOD AND SYSTEM FOR RESONANCE DAMPENING IN WIND TURBINES

BACKGROUND OF THE INVENTION

The subject matter described herein relates generally to methods and systems for resonance dampening, and more particularly, to methods and systems for resonance dampening in wind turbines.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

Modern wind turbines require active damping of mechanical resonances/vibrations in order to reduce mechanical loads, for instance at the drive train and blades, or to avoid instability. U.S. Pat. No. 7,501,798 discloses a method for the active damping of a drive train in a wind energy plant, wherein a correction moment for a generator control is determined. U.S. Pat. No. 7,309,930 discloses a vibration damper which provides a variable signal to control torque produced by a generator of the wind turbine system. The variable torque control signal is based on generator speed and has a first local peak value based on a resonant frequency of an oscillation of a tower of the wind turbine.

Modern wind turbines are deployed in a large variety of electrical grid environments. The effectiveness of resonance damping is dependent on the setup and conditions of the electrical grid the turbine is connected to. If the grid conditions are not known, or have some variability with time, it is challenging to design a resonance damper which will work under each grid condition which may occur during operation. For at least some conditions not accounted for in the original design of the damping system, a conventional resonance damper may lead to increased mechanical loads and can reduce the lifetime of wind turbine components.

One prior attempt of solving this problem was by individual retuning of the resonance damper based on local grid conditions. This, however, is an expensive approach as it requires each location to be treated individually. Further, grid conditions do not only vary between sites, but can also change over time, and the exact conditions might not even be known. This can generally not be handled with retuning.

In view of the above, it is desirable to have a resonance dampening method and system for wind turbines which avoids the cited disadvantages.

BRIEF DESCRIPTION OF THE INVENTION

In one aspect, a resonance damping system for a wind turbine having a generator connected to a power grid is provided. The resonance damping system includes an adaptive resonance damper, operable to provide a control signal for the generator, wherein the variable torque signal of the adaptive resonance damper is automatically adjusted according to a parameter which represents a grid condition.

In another aspect, a vibration damping method for a wind turbine with a turbine rotor mounted on a tower and coupled to a generator by a drive train, the wind turbine being connected to a power grid, is provided. The vibration damping method includes determining a generator demand torque based on sensed rotational speed of the generator; modulating, by an adaptive resonance damper, the generator demand torque by providing a variable torque signal; detecting a grid condition represented by at least one parameter; and, adjusting the variable torque signal of the adaptive resonance damper automatically according to a grid condition represented by at least one grid parameter.

In yet another aspect, a wind turbine having a generator connected to a power grid, with an adaptive resonance damping system, is provided. The resonance damping system includes an adaptive resonance damper, operable to provide a variable torque signal to control the torque produced by the generator, wherein the variable torque signal of the adaptive resonance damper is automatically adjusted according to a grid condition represented by at least one grid parameter.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that enables effective resonance dampening. More specifically, they include wind turbine systems which are adaptive to varying operating conditions of a grid to which the turbine(s) are connected.

Embodiments described herein include a grid adaptive resonance damper. This damper is a function in the main turbine controller that uses the torque control capability of modern wind turbines to dampen mechanical resonances of the turbine such as drive train, tower side-to-side or blade edgewise vibrations by adjusting the torque command sent to the electrical system and generator, so that it dampens the oscillations.

The effectiveness of this kind of resonance damping is essentially a function of the grid conditions. Depending on the grid characteristics, these dampers need to be set differently in order to achieve maximum performance and in severe cases to work at all. Therefore, the adaptive resonance damper according to embodiments automatically adjusts itself according to the current grid conditions. This allows resonance damping over a wide range of grid conditions.

Due to the adaptive nature of the dampening system and method according to embodiments, sufficient damping can be provided even if the grid conditions vary significantly at the turbine site. This might allow turbines to run in conditions where turbines with a normal damper would, for example, fail due to excessive vibration. Therefore, it is possible to place turbines with the adaptive resonance dampers in countries/sites where turbines with a conventional damper would not be economically feasible. This benefit will become more important in the future, as due to higher penetration of wind energy some grids are expected to show greater variability, and wind turbines are expected to handle this variability.

Embodiments described herein include two main functions. The first is a function for identifying the current grid conditions (identification function), while the second is a resonance damper, whose control law is adjusted based on the output from the identification function. Both functions are typically part of the main turbine controller software, but can in embodiments also reside in a subsystem such as the converter control unit (CCU).

The identification function is typically concerned with obtaining and updating the parameters of a simplified model for the combined converter-generator system. For example, if a transfer function from the torque set-point commanded by the turbine controller to the actual air gap torque at the generator is assumed to have the characteristics of a first order system (a low pass filter), then the identification function would continuously need to determine the time constant of this first order system.

While using a first order system with just one parameter is one solution, embodiments described herein are not limited to a fixed model structure, and any transfer function could be used. In embodiments, it is further possible to instead use a fixed model structure to identify any time or frequency domain specifications directly, such as gain and phase lag at a given frequency.

In embodiments, three different options for obtaining the abovementioned grid characteristics are used, which will be further laid out below with respect to FIG. 3 to 5. In embodiments, the grid strength characteristics may also be acquired from an external source. This source may, for example, be a central wind farm controller or the grid strength characteristics may be achieved directly from an operator of the grid.

The second main function according to embodiments is the variable resonance damper. The resonance damper is a function in the wind turbine controller that calculates a torque to be added to the torque commanded by the main speed and power controller based on the measurements of the generator speed, and potentially rotor speed. Unlike conventional resonance damping, the control law used to calculate the torque for resonance damping is not fixed, but a function of the parameters representative of the grid conditions as determined by the first function.

As used herein, the term "vibration dampening system" or "resonance dampening system" is intended to be representative of a system which is capable of reducing vibrations in a wind turbine system. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
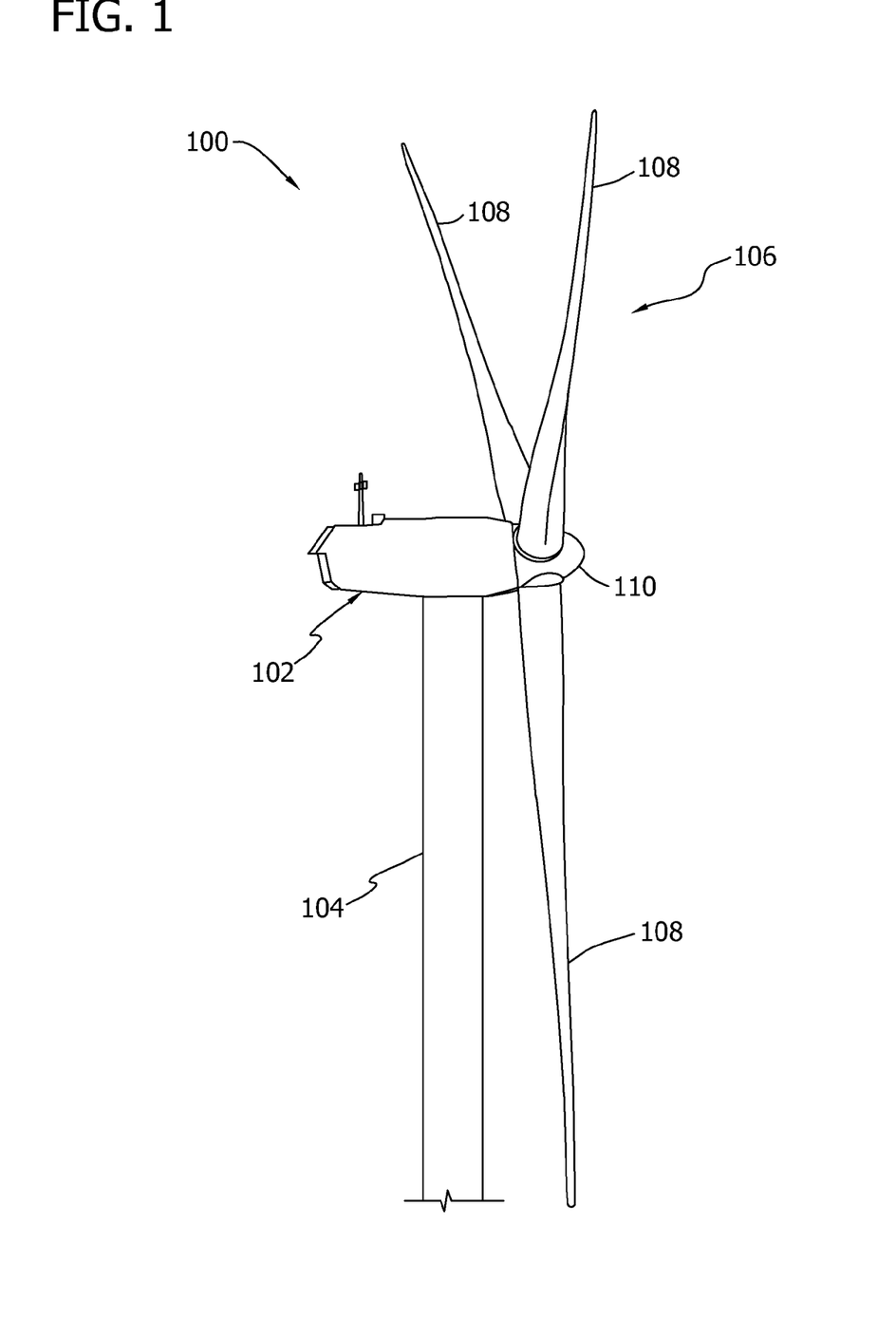
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1). In the following, the mechanical system including rotor 106, gear box 114, and the shafts, couplings etc therebetween are also denounced as rotor and drive train system 103.

Figure 2:
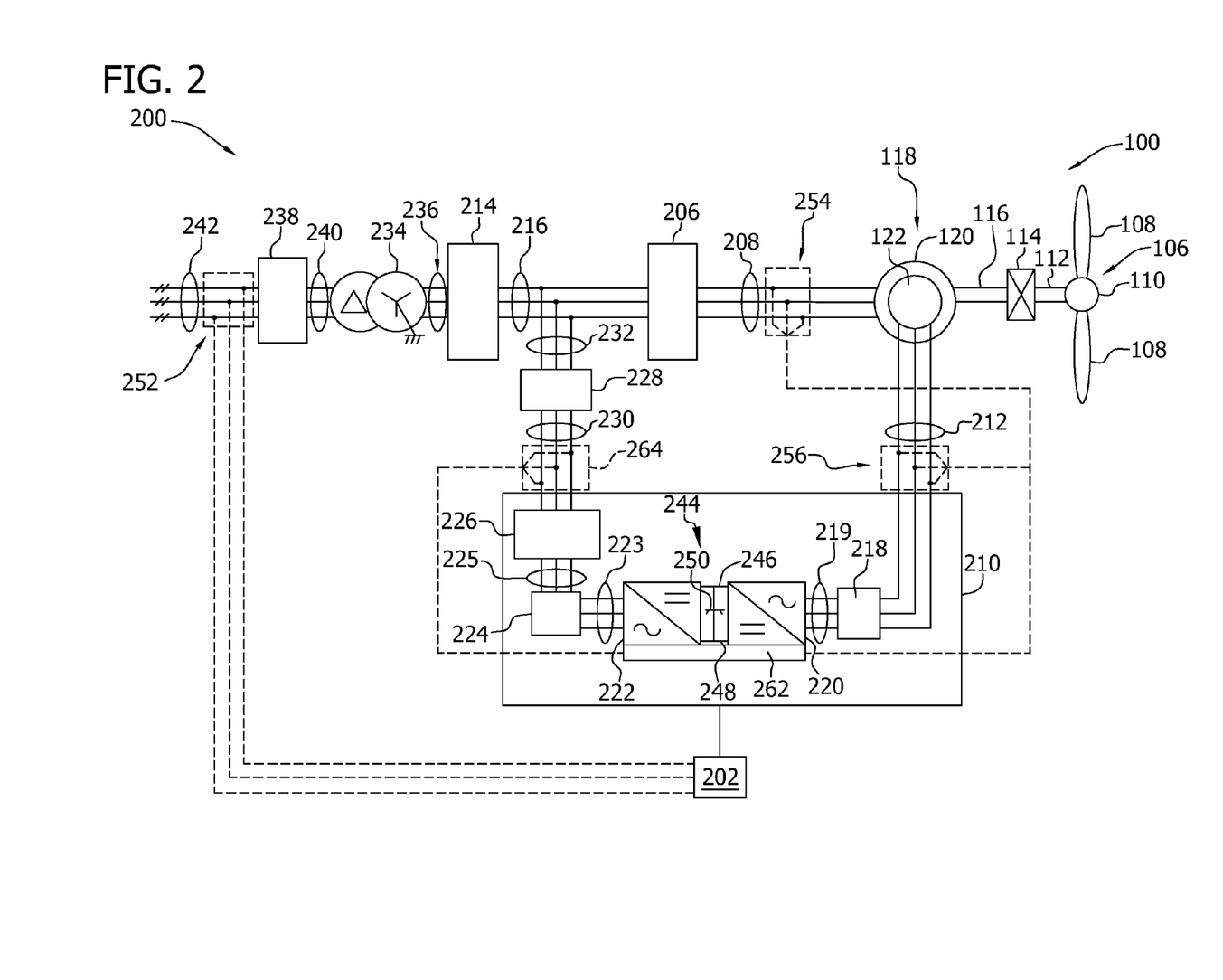
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Not explicitly shown in FIG. 2 are the signal processing blocks 215, 322, the speed and power control unit 306, the adaptive resonance damper 310, system identification block 332, signal generator 330, signal generator 330, and grid strength estimator 318, which are described further below with respect to FIG. 3 to 5. These are typically, but not necessarily part of the turbine control unit 202.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently, through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
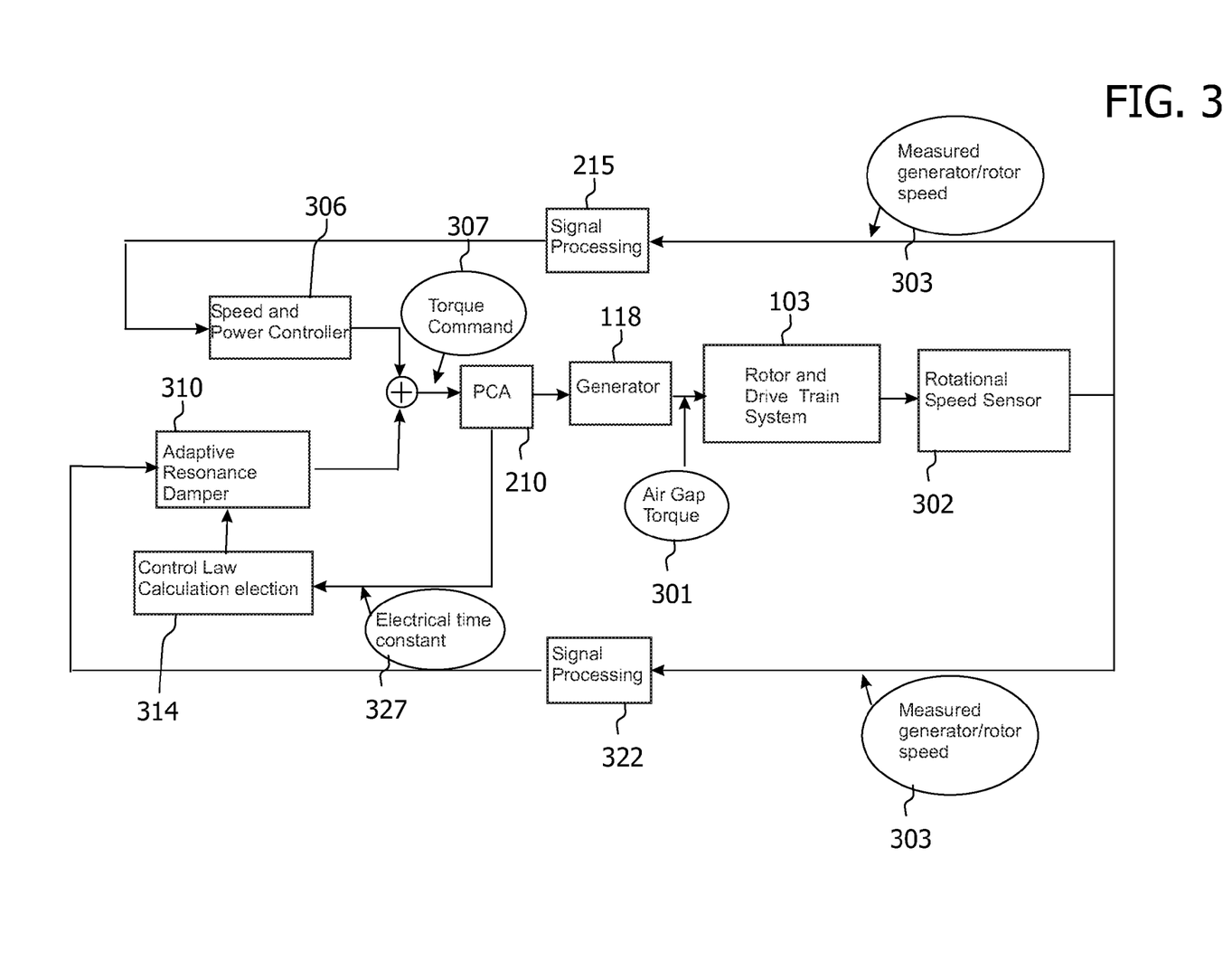
FIG. 3 is a schematic view of a resonance damping control system according to embodiments.

FIG. 3 shows a schematic representation of an adaptive damping system according to embodiments. The wind turbine system includes rotational speed sensor 302 which takes up the speed in the drive train and/or the generator 118. Over signal processing unit 215, this data is used to feed speed and power controller 306. Signal processing unit 322 also takes up the sensor data and uses it to feed the resonance damper 310. The signals from the adaptive resonance damper 310 and the speed and power controller 306 are summed up and fed as a torque command to the Power conversion assembly (PCA) 210. The PCA 210 calculates the values/parameters representing grid conditions, e.g., a time constant, directly based on the PCA-internal control and measurement variables. These variables may typically be generator voltage and -current. This means, the current grid conditions are calculated and represented by a time constant. Over control law calculation election 314, this time constant is fed into the adaptive resonance damper 310, modifying the dampers characteristics.

Figure 4:
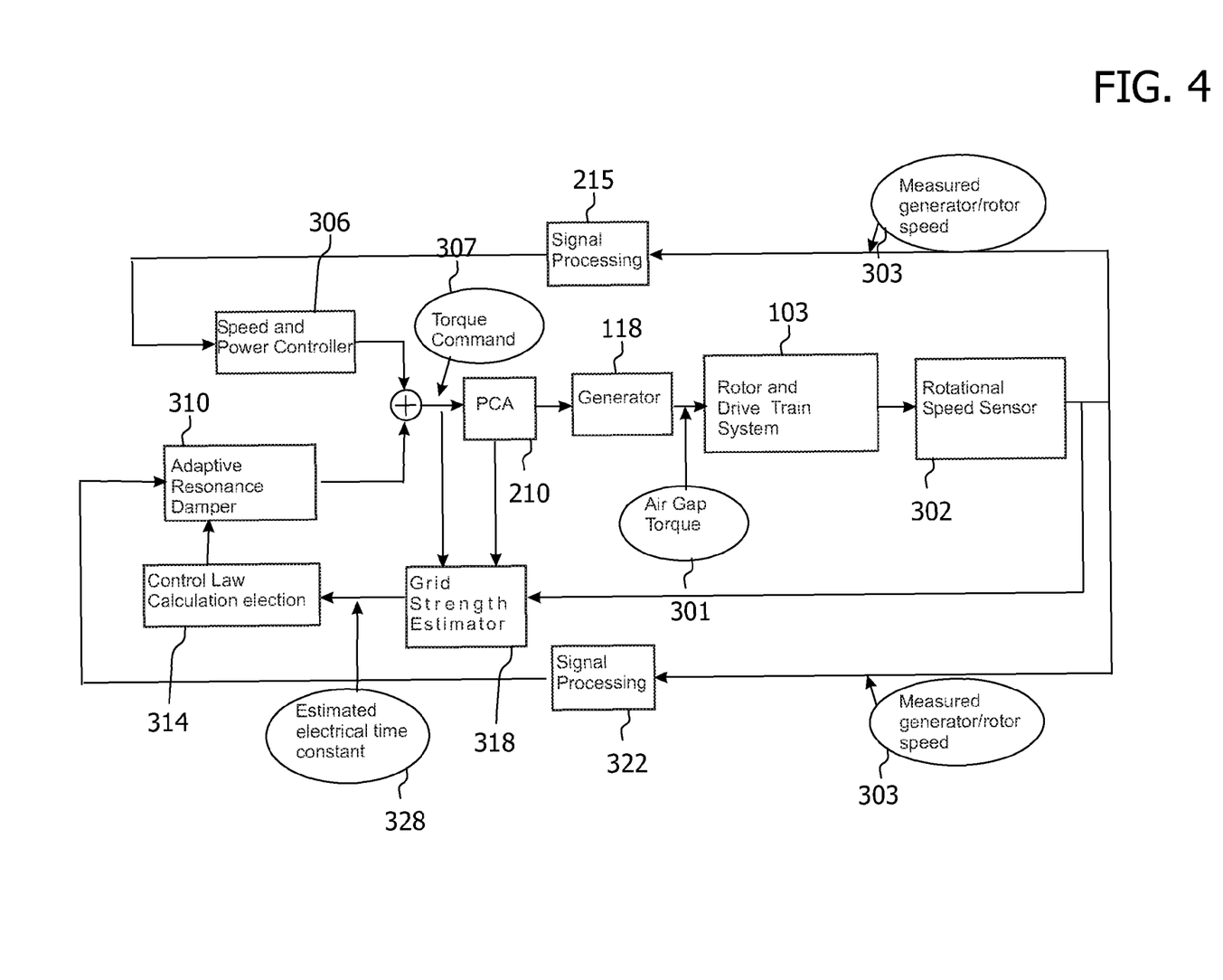
FIG. 4 is a schematic view of a further resonance damping control system according to embodiments.

FIG. 4 shows an observer based online estimation of the grid characteristics according to embodiments of an adaptive resonance damping system. The measured generator and rotor speed 303, the torque command 307, as well as, potentially in embodiments, a number of power conversion assembly internal signals are fed to a dynamic observer such as a Grid strength estimator 318 inside the turbine controller. In embodiments, grid strength estimator 318 is a Kalman filter. The observer continuously compares the measured values against predictions from an internal model stored inside the observer and updates the internal model, so that the mismatch between its predictions and the measurement values decreases. From the model, the parameters representing the grid conditions respectively strength is derived, e.g. an estimated electrical time constant 328. Representing electrical time constant parameters of the internal model are then fed to the adaptive resonance damper 310 via control law calculation election 314.

Figure 5:
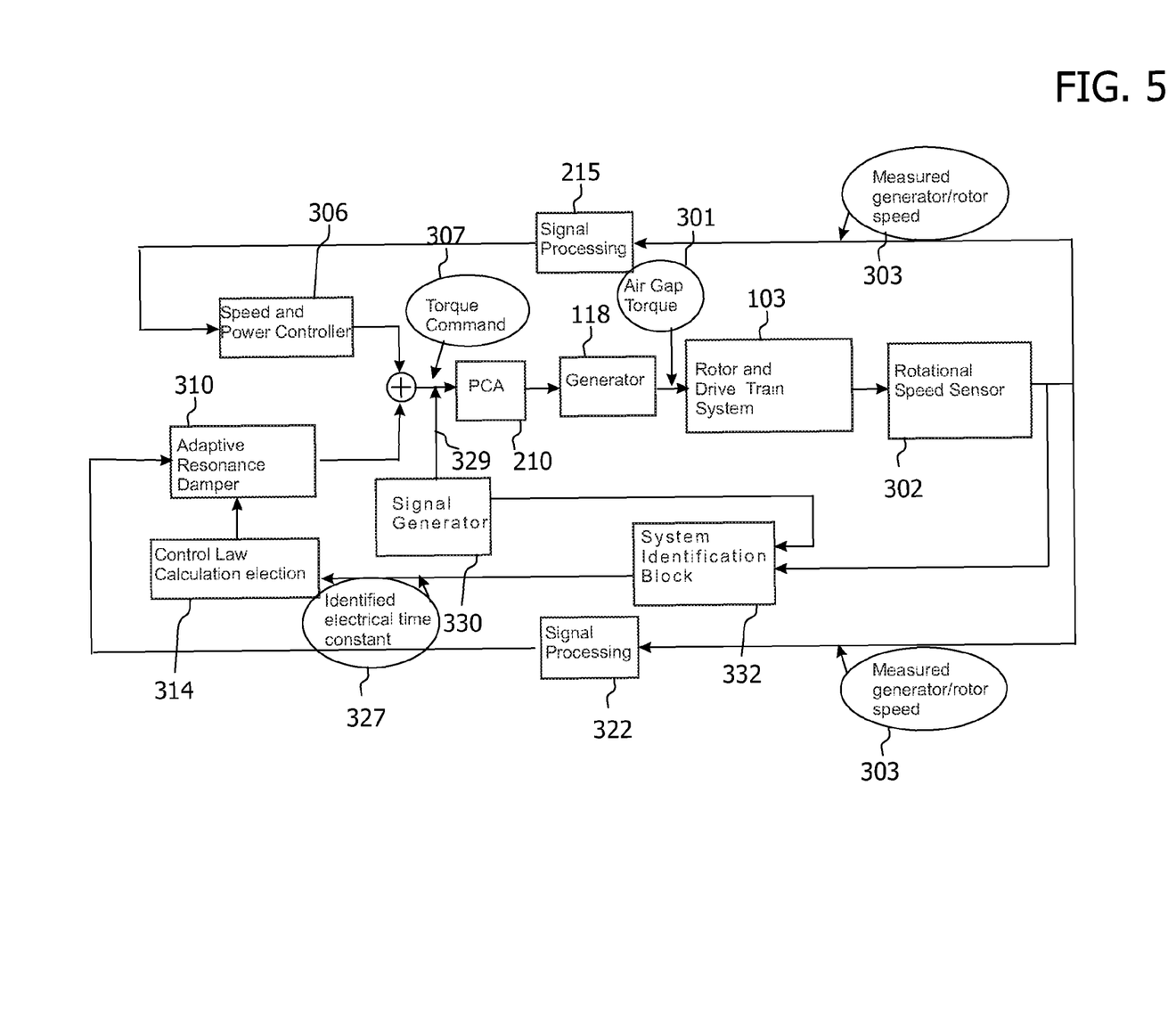
FIG. 5 is a schematic view of a further resonance damping control system according to embodiments.

FIG. 5 shows a periodic system excitation and identification according to embodiments of an adaptive resonance damping system. From time to time, (e.g. at fixed intervals, which may reach from minutes to several months, more typically from 1 hour to 2 months, for example every minute, every hour, every week, or every month), the system is excited by adding an excitation signal 329, generated by a signal generator 330, to the torque command 307 from the main speed and power controller 306 of the wind turbine 100. In embodiments with a simple form, the excitation signal 329 is a harmonic signal with a frequency equal to the frequency of the resonance that is to be damped by the adaptive resonance damper 310. However, more complex signals such as harmonic signals with more than one frequency or PRBS (pseudorandom binary sequence) signals would also be possible. A system identification block 332 then compares the measured response with the excitation 329 and calculates the parameters of the model stored in the system identification block 332. From the model, the electrical time constant 327 of the grid is derived via control law calculation election 314 and fed into adaptive resonance damper 310.

Figure 6:
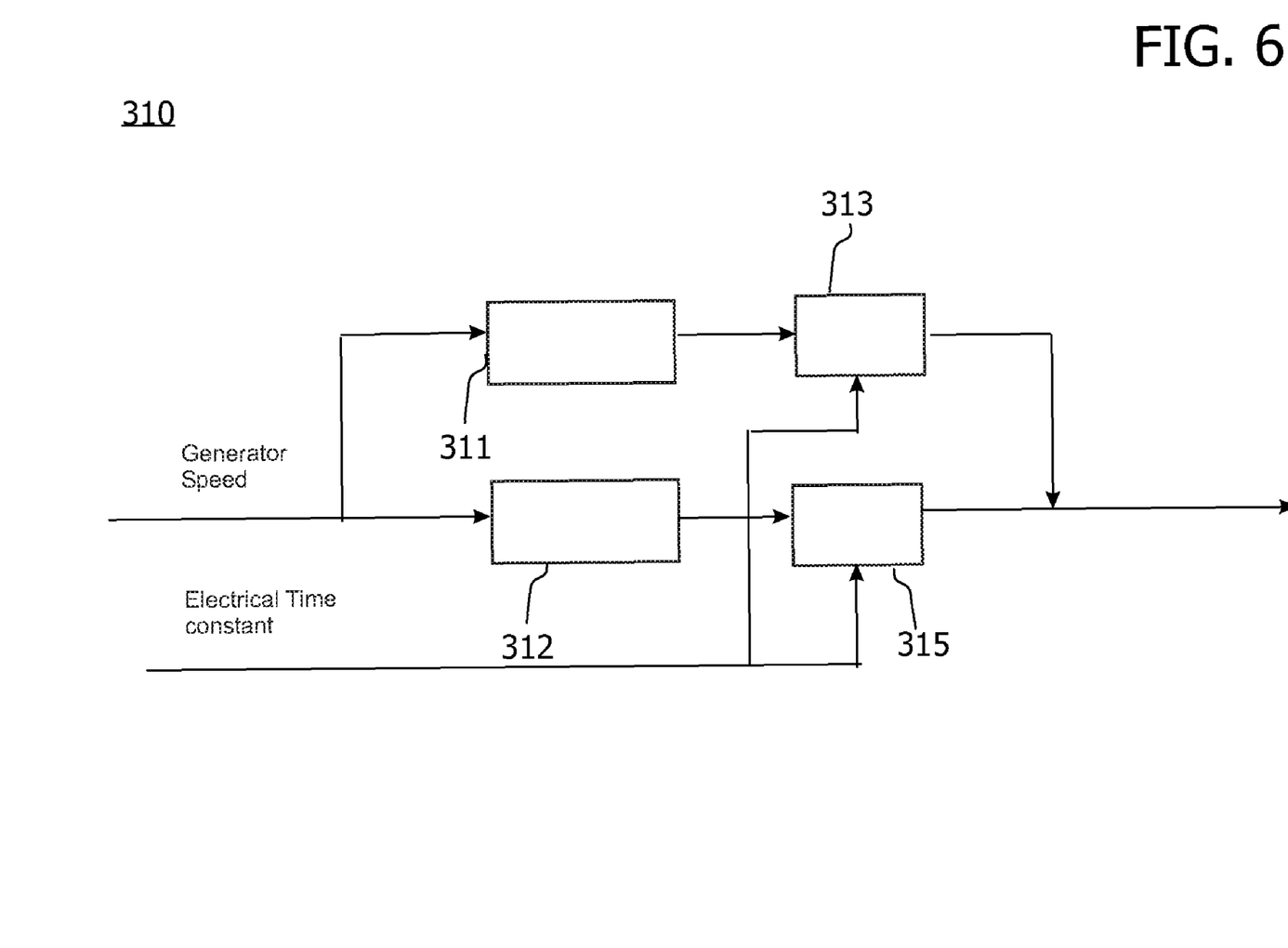
FIG. 6 is a schematic view of a resonance damper according to embodiments.

FIG. 6 shows an exemplary implementation of a resonance damper 310 according to embodiments. It shows two different resonance damper configurations for two different assumed electrical transfer functions, wherein damper 311 is designed for $\tau_1$ and Damper 312 is designed for $\tau_2$. Each of the dampers 311, 312 is set up so that it gives the desired performance at a certain assumed transfer function between torque command and actual torque. The final output of damper 310 is a weighted sum of the outputs from the individual dampers 311, 312, where the weighting functions are determined based on the current grid conditions as determined by the first function. The first weighting function 313 of the first damper 311 in this example is $$1 - \frac{\tau - \tau_1}{\tau_2 - \tau_1}$$

and the second weighting function 315 of the second damper 312 is $$\frac{\tau - \tau_1}{\tau_2 - \tau_1}$$

While the example shows the use of two dampers, embodiments are not limited to using only two dampers, and any number of individual dampers is possible.

Alternatively to the described embodiment with the described "weighted sum" approach, there could be implemented only a single resonance damper, but with the parameters and implementation of this damper, a direct function of the quantities representing grid quality (e.g. electrical time constant) is achieved.

The above-described systems and methods facilitate placement of a wind turbine in a large range of grid conditions without further modifications to the control system, and will lead to lower mechanical loads than conventional resonance damping especially in situations where grid conditions are variable.

More specifically, they facilitate effective resonance damping under varying operating conditions, as their design does not require detailed knowledge of the correct grid conditions and also adapts itself in case of varying conditions.

Exemplary embodiments of systems and methods for adaptive resonance damping are described above in detail. The systems and methods are not limited to the specific embodiments described herein, but rather, components of the systems and/or steps of the methods may be utilized independently and separately from other components and/or steps described herein. For example, they are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A resonance damping system for a wind turbine having a generator connected to a power grid, the resonance damping system comprising:
    an adaptive resonance damper, operable to provide a control signal for the generator, wherein the variable torque signal of the adaptive resonance damper is automatically adjusted according to a parameter which represents a grid condition.

2. The resonance damping system according to claim 1, wherein the adaptive resonance damper is adapted to calculate a grid parameter representing a grid condition from at least one measurement value.

3. The resonance damping system according to claim 2, wherein the grid parameter representing the grid condition is a time constant, and wherein the measurement value comprises at least one of voltage and current of the generator.

4. The resonance damping system according to claim 1, wherein the parameter representing a grid condition is received from an external source outside the wind turbine.

5. The resonance damping system according to claim 1, further comprising:
    a dynamic observer,
    which is adapted to compare measured values with an internal model, and to update the internal model according to differences of measured values to parameters predicted from that model, and wherein the observer is further adapted to feed parameters of the internal model to the adaptive resonance damper.

6. The resonance damping system according to claim 5, wherein the measured values comprise:
    generator speed;
    rotor speed; and
    a torque signal for the generator.

7. The resonance damping system according to claim 6, wherein the dynamic observer comprises a Kalman filter.

8. The resonance damping system according to claim 1, further comprising:
    a signal generator; and
    a system identification block;
    wherein a signal generated by the signal generator is added for excitation to the torque signal from a main speed and power controller of the turbine, and wherein the system identification block then compares a measured response to the excitation with the excitation and calculates the parameters of a model.

9. The resonance damping system according to claim 8, wherein the signal is a harmonic signal having a frequency of the resonance that is to be damped by the adaptive resonance damper.

10. A vibration damping method for a wind turbine with a turbine rotor mounted on a tower and coupled to a generator by a drive train, the wind turbine being connected to a power grid, the vibration damping method comprising:
    determining a generator demand torque based on sensed rotational speed of the generator;
    modulating, by an adaptive resonance damper, the generator demand torque by providing a variable torque signal;
    detecting a grid condition represented by at least one parameter; and
    adjusting the variable torque signal of the adaptive resonance damper automatically according to a grid condition represented by at least one grid parameter.

11. The vibration damping method according to claim 10, further comprising:
    calculating a grid parameter representing a grid condition from at least one measurement value, wherein the measurement value comprises at least one of voltage and current of the generator.

12. The vibration damping method according to claim 10, wherein the parameter representing the grid condition is a time constant.

13. The vibration damping method according to claim 10, wherein detecting a grid condition represented by at least one parameter comprises receiving the parameter from an external source outside the wind turbine.

14. The vibration damping method according to claim 10, further comprising:
    comparing measured values with an internal model;
    updating the internal model according to differences of measured values to parameters predicted from that model; and
    feeding parameters of the internal model to an adaptive resonance damper.

15. The vibration damping method according to claim 14, wherein the measured values comprise:
    generator speed,
    rotor speed, and
    a torque signal for the generator.

16. The vibration damping method according to claim 14, wherein comparing measured values with an internal model is carried out by a Kalman filter.

17. The vibration damping method according to claim 10, further comprising:
    generating a signal by a signal generator;
    adding the signal for excitation to a torque signal, and comparing a response with the excitation and calculating parameters of a model.

18. The vibration damping method according to claim 17, wherein the signal is a harmonic signal having a frequency of a resonance that is to be damped by the adaptive resonance damper.

19. A wind turbine having a generator connected to a power grid, with an adaptive resonance damping system, the resonance damping system comprising:
an adaptive resonance damper, operable to provide a variable torque signal to control the torque produced by the generator, wherein the variable torque signal of the adaptive resonance damper is automatically adjusted according to a grid condition represented by at least one grid parameter.

20. The wind turbine according to claim 19, wherein the grid parameter representing the grid condition is a time constant.

* * * * *